United States Patent [19]

Shimizu et al.

[11] Patent Number: 5,214,113

[45] Date of Patent: May 25, 1993

[54] METHOD OF PREVENTING POLYMER SCALE DEPOSITION AND POLYMER SCALE PREVENTIVE AGENT

[75] Inventors: Toshihide Shimizu, Urayasu; Susumu Ueno; Ichiro Kaneko, both of Hazaki; Mikio Watanabe, Kamisu, all of Japan

[73] Assignee: Shin-Etsu Chemical Co., Ltd., Tokyo, Japan

[21] Appl. No.: 578,349

[22] Filed: Sep. 6, 1990

[51] Int. Cl.$^5$ .................. C08F 2/00; C08F 120/44; C08F 114/06

[52] U.S. Cl. .................... 526/62; 526/200; 526/341; 526/344

[58] Field of Search .............. 526/62, 200, 341, 344

[56] References Cited

U.S. PATENT DOCUMENTS 4,380,614  4/1983  Kidoh et al. .................. 526/62

Primary Examiner—Joseph L. Schofer
Assistant Examiner—Tom Weber
Attorney, Agent, or Firm—Oblon, Spivak, McClelland, Maier & Neustadt

[57] ABSTRACT

A method of preventing polymer scale deposition during polymerization of a monomer having an ethylenically double bond in a polymerization vessel, comprising the step of carrying out said polymerization in a polymerization vessel of which the inner wall surface has a coating comprising:

(A) a lignin, and (B) a cellulose derivative; and a polymer scale preventive agent comprising said components (A) and (B).

Deposition of polymer scale can be effectively prevented; polymers with high whiteness can be prepared; the scale preventive agent used has no poisonousness and are highly safe, therefore this method can be performed with high safe.

12 Claims, No Drawings

METHOD OF PREVENTING POLYMER SCALE DEPOSITION AND POLYMER SCALE PREVENTIVE AGENT

BACKGROUND OF THE INVENTION

1. Field of the Invention

The present invention relates to a method of preventing polymer scale deposition on the inner wall surface and so forth of a polymerization vessel during polymerization of a monomer having an ethylenically double bond.

2. Description of the Prior Art

In processes of preparing polymers by polymerizing a monomer in a polymerization vessel, the problem that polymer deposits on the inner wall surface and so forth in the form of scale, is known.

The deposition of the polymer scale on the inner wall results in disadvantages that the yield of the polymer and the cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer and operators may be exposed thereto, which may cause physical disorders in the operators.

Heretofore, as methods for preventing polymer scale deposition on the inner wall surface and so forth of a polymerization vessel, methods in which a suitable substance is coated on the inner wall surface, etc. as a scale preventive agent.

As the suitable substance acting as a scale preventive agent, there has been disclosed, for example, particular polar compounds (Japanese Patent Publication (KOKOKU) No.30343/1970), a dye or pigment (Japanese Patent Publication (KOKOKU) Nos. 30835/1970, and 24953/1977), etc.

In the meantime, vinyl chloride polymers obtained by polymerization are required to have a good whiteness; specifically, they are required to have an L value according to the Hunter's color difference equation, which is described below, of 70 or more.

The prior art polymer scale preventive agents include a great number of colored substances as exemplified typically by the dyes and pigments described in Japanese Patent Publication (KOKOKU) No. 30835/1970 or 24953/1977, the aromatic amine compounds described in Japanese Pre-examination Patent Publication (KOKAI) No. 50887/1976, and the reaction products of a phenolic compound and an aromatic aldehyde described in Japanese Pre-examination Patent Publication (KOKAI) No. 54317/1980, etc. Due to this, presumably, where suspension polymerization, etc. of vinyl chloride or the like is carried out in a polymerization vessel in which a coating composed of the scale preventive agent above had been formed, colored polymers may be produced. That is, according to measurement of the lightness L in the Hunter's equation described in JIS Z 8730 (1980), the L may be measured to be 65 or less, and coloration is thereby confirmed. Presumably, the coloration is caused by incorporation of components of the coating which has dissolved or peeled into the polymerization system.

Further, many of the prior art polymer scale preventive agents are poisonous as represented by aniline, nitrobenzene, formaldehyde, etc. listed as examples of the polar organic compounds described in Japanese Patent Publication (KOKOKU) No. 30343/1970, and the pigments containing a heavy metal such as chromium and lead described in Japanese Patent Publication (KOKOKU) No. 30835/1970. The dyes described in Japanese Patent Publication (KOKOKU) Nos. 30835/1970 and 24953/1977 include some dyes that involve concern about carcinogenesis. Therefore, use of these substances may cause problems in safety of operators.

SUMMARY OF THE PREFERRED EMBODIMENTS

An object of the present invention is to provide a polymer scale preventive agent which are capable of preventing polymer scale deposition effectively, puts no color to product polymers to thereby produce the polymers with high whiteness, and are not poisonous and therefore causes no concern with respect to safety, and a method of preventing polymer scale deposition using the same.

Thus, the present invention provides, as a means of achieving said object, a method of preventing polymer scale deposition during polymerization of a monomer having an ethylenically double bond in a polymerization vessel, comprising the step of carrying out said polymerization in a polymerization vessel of which the inner wall surface has a coating comprising:
(A) a lignin, and
(B) a cellulose derivative.

The present invention also provides a polymer scale preventive agent for use in polymerization of a monomer having an ethylenically double bond, comprising:
(A) a lignin, and
(B) a cellulose derivative.

According to the present invention, deposition of polymer scale can be effectively prevented; in addition, high whiteness polymers with an L value of 70 or more can be prepared. Moreover, the scale preventive agent used has no poisonousness or the like and is highly safe; hence there is no problem about safety.

Further, according to the present invention, polymer scale deposition can be effectively prevented, irrespectively of polymerization conditions such as the kinds of a monomer and a polymerization initiator, polymerization form, the kind of the material constituting the inner wall of polymerization vessels, etc. That is, deposition of polymer scale can be effectively prevented even in emulsion polymerization in which polymer scale deposition has been so far difficult to prevent, in the case where a polymerization vessel made of stainless steel in which polymer scale has been so far liable to deposit is used, or in the case where a polymerization initiator with a strong oxidizing action such as potassium peroxodisulfate and the like is used.

DETAILED DESCRIPTION OF PREFERRED EMBODIMENTS

(A) Lignins

The lignin as the component (A) of the coating includes, for example, alcohol lignin, dioxane lignin, phenol lignin, hydrotropic lignin, mercaptolignin, sodium lignin sulfonate, lignin thioglycolate, alkali lignin, thioalkali lignin, cuproxam lignin, and periodate lignin. These can be used singly or in combination of two or more; the combination is selected suitably.

(B) Cellulose derivatives

The cellulose derivative as the component (B) of the coating includes, for example, methyl cellulose, ethyl cellulose, hydroxypropyl cellulose, hydroxypropylmethyl cellulose, glycol cellulose, benzyl cellulose, cyanoethyl cellulose, triphenylmethyl cellulose, formyl cellulose, cellulose propionate, cellulose acetate, cellulose acetate propionate, cellulose sulfonate, cellulose carbamate, nitrocellulose, carboxymethyl cellulose, and hemicellulose. These can be used singly or in combination of two or more; the combination is selected suitably.

Formation of coating

The coating comprising said component (A) and component (B) can be formed, for example, by applying a coating solution containing these components to the inner wall surface of a polymerization vessel and then drying.

The coating solution can be prepared by dissolving or dispersing the component (A) and the component (B) in a solvent described later.

The total concentration of the component (A) and the component (B) is not particularly limited, as long as a desired coating weight, i.e., total weight of the component (A) and component (B) per a unit area, described later is obtained. It may be normally from about 0.005 to 20% by weight, preferably from about 0.01 to 10% by weight. In the coating formed, the component (B) is normally contained in an amount of from 0.1 to 1,000 parts by weight, preferably from 1 to 600 parts by weight, per 100 parts by weight of the component (A). Also, in the coating solution, the components (A) and (B) may normally contained in the same amounts as above. If the content of the component (B) is too large or too small relatively to the component (A), the scale preventing effect due to the combined use of the component (A) and the component (B) may not be achieved.

The solvent used for preparation of the coating solution include, for example, water; alcohols such as methanol, ethanol, propanol, butanol, 2-butanol, 2-methyl1-propanol, 2-methyl-2-propanol, 3-methyl-1-butanol, 2-methyl-2-butanol, and 2-pentanol; ketones such as acetone, methyl ethyl ketone, and methyl isobutyl ketone; esters such as methyl formate, ethyl formate, methyl acetate, and methyl acetoacetate; ethers such as 4-methyl dioxolan, and ethylene glycol diethyl ether; furans; and aprotic solvents such as dimethylformamide, dimethyl sulfoxide, and acetonitrile. These solvents are appropriately used singly or as a mixed solvent of two or more.

Moreover, to the polymer scale preventive agent of the present invention, for example, a cationic, nonionic, anionic surfactant or the like can be added as long as it impairs the polymer scale preventing action. An inorganic compound is also optionally added, as long as it impairs neither the polymer scale preventing action nor the non-poisonousness which are intended by the present invention, preferably, in such an amount not as to impair the whiteness of manufactured polymers.

The inorganic compound which may be added to the polymer scale preventive agent of the present invention includes, for example, silicic acids and silicates such as orthosilicic acid, metasilicic acid, mesosilicic acid, mesotrisilicic acid, mesotetrasilicic acid, sodium metasilicate, sodium orthosilicate, sodium disilicate, sodium tetrasilicate, and water glass; metallic compounds such as oxygen acid salts, acetates, nitrates, hydroxides or halides of a metal selected from the group consisting of alkali earth metal elements such as calcium, zinc family elements such as zinc, aluminum family elements such as aluminum, and platinum family elements such as platinum; and inorganic colloids such as ferric hydroxide colloid, colloid of silicic acid, colloid of barium sulfate, and colloid of aluminum hydroxide. These inorganic colloids can be prepared, for example, by mechanical crushing, irradiation with ultrasonic wave, electrical dispersion or chemical methods.

The coating solution thus prepared can be applied to any portions where polymer scale may deposit, so as to form the coating at the portions, irrespectively of the material of the portions; thereby deposition of polymer scale can be prevented at the portions.

Formation of the coating on the inner wall surface of a polymerization vessel using the coating solution above, is conducted by first applying the coating solution to the inner wall surface of the polymerization vessel, then drying the applied coating solution sufficiently, for example, at a temperature in the range of from room temperature to 100° C., if necessary, followed by washing with water. The coating thus formed on the inner wall surface prevents polymer scale from depositing on the inner wall surface during polymerization.

The method of applying the coating solution is not particularly limited, and includes, for example, the brush coating, spray coating, the method of filing the polymerization vessel with the coating solution followed by withdrawal thereof, and automatic coating methods as disclosed in Japanese Pre-examination Patent Publication (KOKAI) Nos. 61001/1982 and 36288/1980, and Japanese Pre-examination Patent Publication (KOHYO) Nos. 501116/1981 and 501117/1981, and Japanese Pre-examination Publication (KOKAI) Nos. 11303/1984, etc.

The method of drying wet coated surfaces provided by application of the coating solution, is not limited, either. Following methods can be used. That is, a method in which, after the solution is applied, hot air with an suitable elevated temperature is blown to the coated surface, and a method in which the inner wall surface of a polymerization vessel and the surfaces of other parts to be coated are previously heated to from 30° to 80° C., and the coating solution is directly applied to the heated inner wall surfaces, etc. After dried, the coated surfaces are washed with water if necessary.

Said coating solution is preferably applied to not only the inner wall surface of a polymerization vessel but also other parts with which the monomer comes into contact during polymerization to form the coating on such parts. For example, it is preferred to apply the coating solution to a stirring shaft, stirring blades, condensers, headers, search coil, bolts, nuts, etc. to form the coating thereon. Particularly, on stirring blades, stirring shaft and baffles, the coating should be formed by application of the coating solution. The formation of the coating on these parts by application of the coating solution can be performed in the same manner as in the formation of the coating on the inner wall surface.

More preferably, for formation of the coating, said coating solution is applied to portions with which monomer does not come into contact during polymerization but on which polymer scale may deposit, for example, portions of recovery system for unreacted monomer with which unreacted monomer comes into contact, such as inner surfaces, etc. of equipment and pipes of the recovery system. Specifically, such portions include the inner surfaces of monomer distillation columns, condensers, monomer stock tanks and valves. Formation of the coating on such portions also may be performed in the same manner as the formation of the coating on the inner wall surface of a polymerization vessel of a polymerization vessel.

Where the coating is formed as described above on the portion with which monomer comes into contact during polymerization and other portions where polymer scale may deposit, deposition of polymer scale is prevented on these portions.

The coating formed as described above has normally a coating weight, i.e., a total weight of the component (A) and the component (B) per a unit area, of 0.001 g/m² or more, preferably from 0.05 to 2 g/M², after dried.

The coating operation described above may be conducted every 1 to ten-odd batches of polymerization. The formed coating has good durability and retains the scale-preventing action; therefore the coating operation is not necessarily performed every batch of polymerization. Consequently, productivity in production of polymer is improved.

Furthermore, said coating solution used for the coating operation can be used not only for the coating operation on the inner wall surface, etc. of a polymerization vessel, but also for addition in a small amount to polymerization medium. Such addition of the coating solution enhances the polymer scale preventing effect. The amount of the coating solution added to the polymerization medium normally may range from 5 to 1,000 ppm based on the whole weight of the monomer charged.

Polymerization

After the formation of the coating on the inner wall surface of a polymerization vessel, other parts with which monomer may come into contact, etc. by coating operation, polymerization is carried out in accordance with conventional procedures. That is, a monomer having an ethylenically double bond, a polymerization initiator (catalyst), and optionally a polymerization medium such as water, etc., a suspending agent, a solid dispersing agent, a dispersing agent such as nonionic or anionic surfactants are charged into the polymerization vessel, followed by carrying out polymerization according to conventional methods.

The monomer having an ethylenically double bond to which the method of this invention can be applied may include, for example, vinyl halides such as vinyl chloride; vinyl esters such as vinyl acetate and vinyl propionate; acrylic acid, methacrylic acid, and esters or salts of these; maleic acid, fumaric acid, and esters or anhydrides thereof; and diene monomers such as butadiene, chloroprene and isoprene; as well as styrene, acrylonitrile, halogenated vinylidenes, and vinyl ethers.

There are no particular limitations on the form of polymerization to which the method of this invention can be applied. The present invention is effective in any forms of polymerization such as suspension polymerization, emulsion polymerization, solution polymerization, bulk polymerization, and gas phase polymerization. Particularly, the present method is more suitable to polymerizations in an aqueous medium such as suspension or emulsion polymerization.

In the following, general conditions are described on each form of polymerization.

In the case of suspension or emulsion polymerization, first, water and a dispersing agent are charged into a polymerization vessel, and thereafter a polymerization initiator is charged. Subsequently, the inside of the polymerization vessel is evacuated to a pressure of from 0.1 to 760 mmHg, and a monomer is then charged (whereupon the pressure inside the polymerization vessel usually becomes from 0.5 to 30 kgf/cm².G). Thereafter polymerization is carried out at a temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization may be judged to be completed when the pressure inside the polymerization vessel falls to from 0 to 7 kgf/cm².G or when cooling water which passes through a jacket provided around the polymerization vessel indicates almost the same temperature at the inlet where it is charged and at the outlet where it is discharged (i.e., when exothermic heat due to polymerization reaction becomes zero). The water, dispersing agent and polymerization initiator to be charged for polymerization are used in amounts of 20 to 500 parts by weight, 0.01 to 30 parts by weight, and 0.01 to 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those described for suspension and emulsion polymerizations.

In the case of bulk polymerization, after the inside of a polymerization vessel is evacuated to a pressure of from about 0.01 mmHg to about 760 mmHg, a monomer and a polymerization initiator are charged into the polymerization vessel, and then polymerization is carried out at a temperature of from −10° C. to 250° C. Specific methods of the bulk polymerization includes, for example, liquid bulk polymerization and gas phase polymerization for vinyl chloride.

Application of the method of preventing polymer scale deposition of the present invention to polymerization, makes it possible to prevent polymer scale from depositing regardless of materials constituting the inner wall, etc. of a polymerization vessel. For example, this method can prevent deposition of polymer scale even in the case polymerization is carried out in a polymerization vessel made of a steel including stainless steel or lined with glass.

Any additive materials that have been conventionally added in a polymerization system can be used without any limitation. More specifically, the method of this invention can effectively prevent polymers from depositing, even in polymerization systems containing the following additives: for example, polymerization catalysts such as t-butyl peroxyneodecanoate, bis(2-ethylhexyl) peroxydicarbonate, 3,5,5-trimethylhexanoyl peroxide, α-cymyl peroxyneodecanoate, cumene hydroperoxide, cyclohexanone peroxide, t-butyl peroxypivalate, bis(2ethylhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, p-menthane hydroperoxide; suspension agents comprised of natural or synthetic polymeric compounds such as partially saponified polyvinyl alcohols, polyacrylic acids, vinyl acetate/maleic anhydride copolymer, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans such as t-dodecyl mercaptan, and trichloroethylene; and pH adjusters.

EXAMPLES

The present invention is now described in detail by way of working examples and comparative examples. In each of the tables below, Experiment Nos. marked with * indicate comparative examples, and the other Experiment Nos., working examples of the present invention.

Example 1

Polymerization was carried out in the following manner using a polymerization vessel with an inner capacity of 1,000 liters and having a stirrer.

In each experiment, first, a component (A) and a component (B) were dissolved in a solvent so that the total concentration thereof might become the value given in Table 1, to prepare a coating solution. The coating solution was applied to the inner wall and other parts with which a monomer comes into contact during polymerization, including the stirring shaft and stirring blades, followed by drying under heating at 60° C. for 15 min. to form a coating, which was then washed with water.

However, Experiment Nos. 101 to 103 are comparative examples in which no coating solution was applied, or a coating solution containing either a component (A) or a component (B) was applied; Experiment No. 106 is a comparative example in which a coating solution containing Sudan B, Nigrosine and $Na_2SiO_3$ (weight ratio: 100/100/100) in methanol (which is one used in Experiment No. 33 described in Japanese Patent Publication (KOKOKU) No. 24953/1977), was used.

The kind of the (A) lignin and (B) cellulose derivative used, the total concentration of (A)+(B) and the weight ratio of (A)/(B) in the coating solution, and the solvent used in each experiment are given in Table 1.

Subsequently, in the polymerization vessel in which a coating had been formed by the coating operation above, were charged 400 kg of water, 200 kg of vinyl chloride, 250 g of partially saponified polyvinyl alcohol, 25 g of hydroxypropylmethyl cellulose and 75 g of bis(2-ethylhexyl) peroxydicarbonate. Then, polymerization was carried out at 57° C. with stirring for 6 hours. After the completion of the polymerization, the amount of polymer scale depositing on the inner wall of the polymerization vessel was measured. Further, the whiteness of the polymer obtained in each Experiment was measured according to the following method.

A hundred parts by weight of a polymer, one part by weight of a dibutyl tin laurate stabilizing agent TS-101 (tradename, product of Akishima Chemical Co.) and 0.5 part by weight of a cd complex-type liquid stabilizing agent C-100J (tradename, product of Katsuta Kako Co.), and 50 parts by weight of a plasticizer DOP were kneaded at 160° C. for 5 min. with a twin roll mill, and then formed into a sheet 1 mm thick. Subsequently, this sheet was placed in a mold measuring 4 cm×4 cm×1.5 cm (thickness), and molded under heating at 160° C. and under the pressure of 65 to 70 kgf/$cm^2$ to prepare a test specimen. This test specimen was measured for lightness L in the Hunter's color difference equation described in JIS Z 8730 (1980). Whiteness was evaluated to become higher with increase in L value.

The L value was determined as follows.

The stimulus value Y of XYZ color system was determined according to the photoelectric tristimulus colorimetry using the standard light C, a photoelectric colorimeter (Color measuring color difference meter Model Z-1001DP, product of Nippon Denshoku Kogyo K.K.) in accordance with JIS Z 8722. As the geometric condition for illumination and receiving of light, the condition (d) defined in section 4.3.1 of JIS Z 8722 was adopted. Next, L was calculated based on the equation: $L=10Y^{\frac{1}{2}}$ described in JIS Z 8730(1980).

The results are given in Table 1.

TABLE 1

| Exp. No. | (A) Lignin | (B) Cellulose derivative | (A) + (B) total concentration (wt. %) | Weight ratio (A)/(B) | Solvent (weight ratio) | Amount of Polymer scale (g/$m^2$) | L value |
|---|---|---|---|---|---|---|---|
| 101* | — | — | — | — | — | 1300 | 73 |
| 102* | Alkali lignin | — | 0.5 | 100/0 | Water/Methanol (90/10) | 1200 | 72.5 |
| 103* | — | Glycol cellulose | 0.5 | 0/100 | Water/Methanol (90/10) | 1100 | 73 |
| 104 | Alkali lignin | Glycol cellulose | 0.5 | 100/200 | Water | 1 | 73 |
| 105 | Lignin thioglycolate | Methyl cellulose | 0.5 | 200/200 | Water/Methanol (90/10) | 2 | 72.5 |
| 106* | Coating solution of Exp. No. 33 described in Japanese Patent Publication (KOUKOKU) No. 24953/1977 | | | | | 10 | 65 |

Example 2

In each experiment, the coating procedure of Example 1 was repeated for a stainless steel polymerization vessel with a capacity of 20 liters and equipped with a stirrer, except for using the coating solution of which the (A) lignin and (B) cellulose derivative, the total concentration of (A)+(B), the weight ratio of (A)/(B), and the solvent used are as shown in Table 2. However, Experiment Nos. 201-203 are comparative examples in which no coating solution was coated, or a coating solution containing either a component (A) or a component (B) was used.

Subsequently, in the polymerization vessel thus coating-treated, were charged 9 kg of water, 225 g of sodium dodecylbenzenesulfonate, 12 g of t-dodecyl mercaptan, and 13 g of potassium peroxodisulfate. After the inner atmosphere was replaced with a nitrogen gas, 1.3 kg of styrene and 3.8 kg of butadiene were charged, followed by polymerization at 50° C. for 20 hours. After completion of the polymerization, the amount of polymer scale depositing on the inner wall of the polymerization vessel was measured. The results are given in Table 2.

TABLE 2

| Exp. No. | (A) Lignin | (B) Cellulose derivative | (A) + (B) total concentration (wt. %) | Weight ratio (A)/(B) | Solvent (weight ratio) | Amount of Polymer scale (g/m$^2$) |
|---|---|---|---|---|---|---|
| 201* | — | — | — | — | — | 400 |
| 202* | Alkali lignin | — | 0.5 | 100/0 | Water/Methanol (90/10) | 390 |
| 203* | — | Carboxymethyl cellulose | 0.5 | 0/100 | Water/Methanol (90/10) | 380 |
| 204 | Alkali lignin | Carboxymethyl cellulose | 0.5 | 100/50 | Water/Methanol (90/10) | 1 |
| 205 | Sodium lignin sulfonate | Hydroxypropyl cellulose | 0.5 | 100/100 | Water/Methanol (90/10) | 2 |

We claim:

1. A method of preventing polymer scale deposition during polymerization of a monomer having an ethylenic double bond in a polymerization vessel, comprising the step of carrying out said polymerization in a polymerization vessel of which the inner wall surface has a coating comprising:
   (A) a lignin, and
   (B) a cellulose comprising at least one member selected from the group consisting of methyl cellulose, ethyl cellulose, hydroxypropyl cellulose, hydroxypropylmethyl cellulose, glycol cellulose, benzyl cellulose, cyanoethyl cellulose, triphenylmethyl cellulose, formyl cellulose, cellulose propionate, cellulose acetate, cellulose acetate propionate, cellulose sulfonate, cellulose carbamate, nitrocellulose carboxymethyl cellulose and hemicellulose.

2. The method according to claim 1, wherein said (A) lignin comprises at least one member selected from the group consisting of alcohol lignin, dioxane lignin, phenol lignin, hydrotropic lignin, mercaptolignin, sodium lignin sulfonate, lignin thioglycolate, alkali lignin, thioalkali lignin, cuproxam lignin, and periodate lignin.

3. The method according to claim 1, wherein said coating contains said component (B) in an amount of from 0.1 to 1,000 parts by weight per 100 parts by weight of said component (A).

4. The method according to claim 1, wherein said coating has a coating weight of 0.001 g/m$^2$ or more.

5. The method according to claim 1, wherein said coating is formed by applying a coating solution containing said components (A) and (B) to the inner wall surface of the polymerization vessel, followed by drying.

6. The method according to claim 1, wherein said coating solution contains said component (B) in an amount of from 0.1 to 1,000 parts by weight per 100 parts by weight of said component (A), and has a total concentration of said components (A) and (B) of from 0.005 to 20% by weight.

7. The method according to claim 1, wherein said coating has been also previously formed on parts of the polymerization vessel with which the monomer comes into contact during polymerization other than its inner wall surface.

8. The method according to claim 7, wherein said parts with which the monomer comes into contact comprise at least one member selected from the group consisting of a stirring shaft, stirring blades, baffles, headers, search coils and condensers.

9. The method according to claim 1, wherein said coating has been further previously formed at parts of the recovery system for unreacted monomer with which unreacted monomer comes into contact.

10. The method according to claim 1, wherein the monomer is at least one member selected from the group consisting of vinyl halides; vinyl esters; acrylic acid, methacrylic acid, and esters and salts thereof; maleic acid and fumaric acid, and esters and anhydrides thereof; diene monomers; aromatic vinyl compounds; acrylates; acrylonitrile; halogenated vinylidenes; and vinyl ethers.

11. The method according to claim 1, wherein said polymerization is carried out as suspension polymerization, emulsion polymerization, solution polymerization, bulk polymerization, or gas phase polymerization.

12. The method according to claim 5, wherein said coating solution is added to the polymerization medium.

* * * * *